United States Patent [19]

Sweet et al.

[11] 4,009,873
[45] Mar. 1, 1977

[54] AIR-RIDE SUSPENSION ASSEMBLY

[75] Inventors: Philip J. Sweet; Buck C. Hamlet; David L. Sweet, all of Fresno, Calif.

[73] Assignee: American Carrier Equipment, Inc., Fresno, Calif.

[22] Filed: Oct. 20, 1975

[21] Appl. No.: 623,646

[52] U.S. Cl. .............................. 267/15 A; 267/31; 267/65 A; 280/712

[51] Int. Cl.² ....................................... B60G 11/46

[58] Field of Search .............. 267/31, 32, 56, 65 A, 267/65 B, 18, 15 A; 280/124 F, 104.5, 106.5, 692, 697, 693, 698, 710, 711, 712, 703, 713; 188/298; 213/43; 105/197, 3

[56] References Cited

UNITED STATES PATENTS

| 3,140,083 | 7/1964 | Paul | 267/31 |
| 3,162,465 | 12/1964 | Vaugoyeau | 267/65 A |
| 3,309,107 | 3/1967 | Chieger | 267/56 |
| 3,782,753 | 1/1974 | Sweet et al. | 267/31 |
| 3,866,894 | 2/1975 | Sweet et al. | 267/31 |

*Primary Examiner*—James B. Marbert
*Attorney, Agent, or Firm*—Huebner & Worrel

[57] ABSTRACT

An air-ride suspension assembly particularly adapted to be installed as an integrated unit on the frame of a wheeled vehicle. The assembly includes a cradle adapted to be extended transversely beneath the frame of a selected vehicle and supported in suspension at the adjacent ends thereof by a pair of laterally spaced leaf springs shackled thereto and mounted on the axle of the vehicle, a pair of laterally spaced vertically oriented air bags seated on the cradle and a transverse pillow plate seated on said pair of air bags and adapted to be united in supporting relation with the adjacent end portions of the frame of the vehicle whereby a conventional spring suspension system can readily be converted to an air-ride suspension system with minimal loss of time and attendant expense.

9 Claims, 4 Drawing Figures

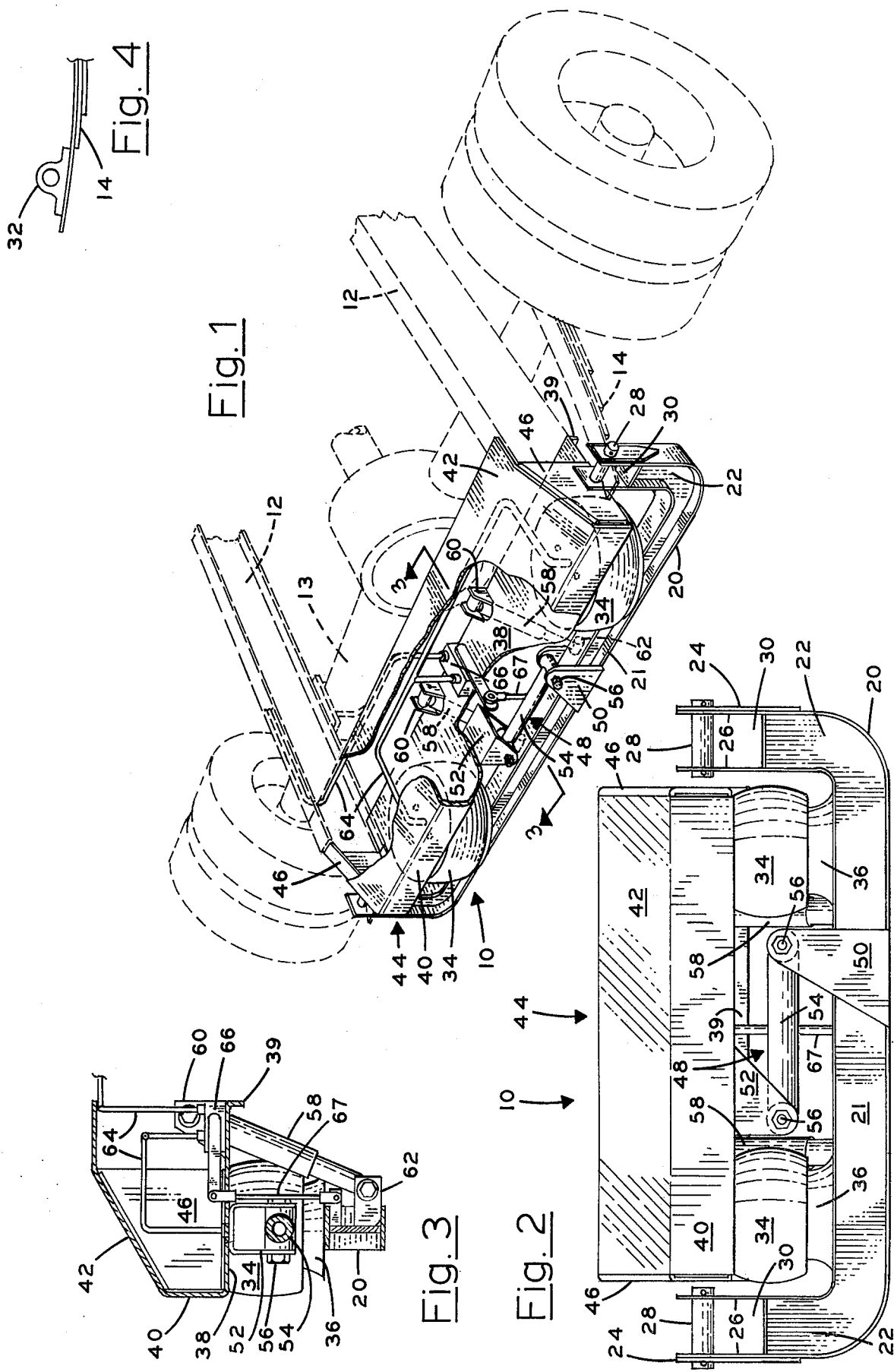

AIR-RIDE SUSPENSION ASSEMBLY

BACKGROUND OF THE INVENTION

1. Field of the Invention

The invention generally relates to air-ride suspension systems for vehicles, and more particularly to an air-ride suspension assembly adapted to be fabricated and provided in kit form for installation as an integrated unit on the frame of a vehicle.

2. Description of the Prior Art

The prior art, of course, is replete with air-ride suspension systems of numerous configurations. One such system is that disclosed in U.S. Letters Patent No. 3,866,894 to Phillip J. Sweet et al, the disclosure being incorporated herein by reference thereto.

However, as can be appreciated by those familiar with the design, installation and operation of air-ride suspension systems, it often becomes desirable to convert suspension systems, characterized by leaf springs and the like, to suspension systems, characterized by air bags. The desirability for conversion may occur after the vehicle with which the suspension system is associated has been in operation for a substantial period of time. Heretofore, in order to accommodate a conversion of a suspension assembly for a given vehicle, it has been found necessary to remove the vehicle from an operational status, with an attendant loss of productivity, for a period sufficient to accommodate the desired conversion. Usually this period is of a substantial duration and results in an economic loss of significant proportions.

Moreover, heretofore substantial difficulty has been encountered in converting a suspension system for a vehicle equipped with a live axle to a suspension system utilizing an air bag. This difficulty arises, in part, because of limitations on space and the difficulties inherently encountered in re-fitting a suspension system with the frame of a vehicle.

Consequently, as is generally recognized in the industry, there exists a need for an air-ride suspension system particularly suited for use in rapidly and economically re-fitting vehicles, particularly those characterized by live axles, such as trucks, tractors and the like, in order to convert conventional suspension systems to air-ride suspension systems with minimal labor requirements and loss of operational time.

It is, therefore, the general purpose of the instant invention to provide a pre-fabricated air-ride suspension system which is particularly adapted for use in converting suspension systems characterized by leaf springs to suspension systems characterized by air bags, whereby down-time for the vehicle and the labor required of shop personnel are minimized.

OBJECTS AND SUMMARY OF THE INVENTION

It is an object of the instant invention to provide an air-ride suspension assembly which overcomes the aforementioned difficulties and disadvantages, unattended by reduction in operational efficiency.

It is another object to provide an air-ride suspension assembly for use in converting suspension assemblies, characterized by leaf springs, to suspension assemblies characterized by air bags.

It is another object to provide an air-ride suspension assembly particularly adapted to be installed as a replacement unit on a wheeled vehicle characterized by a live axle.

It is another object to provide an air-ride suspension system having a capability of being preassembled, shipped in a palletized configuration, and rapidly installed on the frame of a vehicle with minimal loss of operational time for the vehicle.

It is another object to provide an air-ride suspension system particularly adapted to be fabricated, shipped and installed as an integrated unit with minimal labor and time requirements.

Another object is to provide in combination with a wheeled vehicle an air-ride suspension system installed as an integrated replacement unit.

Another object is to provide an air-ride suspension system which is particularly suited for use in converting a conventional spring suspension system of a wheeled vehicle, characterized by a live axle, to an air-ride suspension system, although not necessarily restricted in use thereto since the air-ride suspension assembly which embodies the principles of the instant invention can successfully be incorporated in vehicles during new assembly, and in vehicles such as semi-trailers, full trailers and the like.

These and other objects and advantages are achieved through an air-ride suspension system characterized by a cradle adapted to be extended transversely beneath the frame of a selected wheeled vehicle and supported at each of its opposite ends by a pair of leaf springs shackled thereto, a plurality of air bags mounted on the cradle in supporting relationship with a pillow plate adapted to receive the frame of a wheeled vehicle in supporting relationship, as will become more readily apparent by reference to the following description and claims in light of the accompanying drawings.

BRIEF DESCRIPTION OF THE DRAWINGS

FIG. 1 is a perspective view of an air-ride suspension system which embodies the principles of the instant invention, broken away for the sake of clarity.

FIG. 2 is an end elevational view of the assembly shown in FIG. 1.

FIG. 3 is a cross-sectional view taken generally along line 3—3 of FIG. 1.

FIG. 4 is a fragmented view illustrating a pillow block mounted on a truncated end portion of a leaf spring, and particularly useful in the installation of the air-ride suspension shown in FIG. 1.

DESCRIPTION OF THE PREFERRED EMBODIMENT

Referring now to the drawings wherein like reference characters designate like or corresponding parts throughout the several views, there is shown in FIG. 1 an air-ride suspension assembly, generally designated 10, which embodies the principles of the instant invention.

As illustrated in FIG. 1, the air-ride suspension system is mounted in supporting relationship with a pair of longitudinal frame members 12 provided for a frame of a vehicle, such as is frequently provided for trucks, tractors, and the like. Moreover, the vehicle illustrated in FIG. 1 is characterized by a housing 13, for a live axle, having mounted thereon a pair of laterally spaced leaf springs 14. The springs 14 are suitably mounted on the housing in a manner well understood by those familiar with the assembly of suspension systems for vehicles.

It is important, at this juncture, to fully appreciate that the air-ride suspension assembly 10 comprises a fully pre-fabricated unit which is particularly adapted to be delivered and subsequently installed in its pre-fabricated configuration as a replacement unit for a conventional suspension assembly, characterized by a pair of leaf springs or the like, which has been cut from the frame of a vehicle using suitable cutting tools, including oxy-acetylene torches.

The air-ride suspension assembly 10 includes a cradle 20 of a truncated U-shaped configuration. The cradle, as shown, includes an elongated base 21 fabricated in a manner fully understood by those familiar with the metal-working arts. As a practical matter, the base 21 comprises a beam having projected upwardly therefrom, in substantial parallelism, a pair of integrally related portions defining end portions 22 for the base 21.

At the extended end of the end portions 22 for the base 21 there is provided a pair of shackles 24. These shackles are particularly adapted for coupling the cradle 20 with leaf springs, such as the leaf springs designated 14 in FIG. 1. As currently employed, each of the shackles 24 includes a pair of laterally spaced plates 26 having extended therebetween a bearing pin 28 defining a cage 30. The cage 30 serves to receive an extended end portion of one of the leaf srings, as illustrated in FIG. 1.

As shown in FIG. 1, the bearing pin 28 is particularly suited to rest upon the upper surface of the truncated end portion of a leaf spring 14. However, where so desired, a pillow block 32 is provided and welded to the upper surface of the leaf spring 14 to be joined to the cradle 20, as illustrated in FIG. 4. The pillow block 32 includes an opening for receiving the bearing pin 28 for thus establishing a positive coupling of the cradle to the leaf spring.

Seated on the upper surface of the base 21, in a laterally spaced relationship, there is a pair of air bags 34. The specific configuration of the air bags 34 is a matter of choice, dictated by various factors, including space and weight constraints. As shown, the air bags 34 are of the type commonly referred to as a "rolling lobe" air bag, however, single and double convolute air bags can be employed equally as well.

As shown, each of the air bags 34 includes a pedestal 36 welded or otherwise rigidly affixed to the base 21 of the cradle 20. Seated on the upper surface of the pair of air bags 34, there is a pillow plate 38, as best illustrated in FIG. 3.

As a practical matter, the pillow plate 38 also is integrally related with a vertically oriented end plate 40 and a vertically spaced cover plate 42. The pillow plate, end plate and cover plate collectively form a housing, generally designated 44, which serves to receive the portions of frame members, such as the frame members 12, severed just forward of the coupling points for the shackles as they previously existed. The housing 44 preferably is completed by a pair of gusset plates 46 which serve to close the opposite ends of the housing 44. These plates are joined in contiguous relation with the severed longitudinal frame members of the vehicle, by welding or the like. Thus, the housing 44 can be utilized effectively in coupling the air-ride suspension assembly 10 to the frame members.

It is to be understood that the housing 44 is symmetrical to the cradle 20 with suitable spacing being provided between the base 21 and the housing. In order to maintain symmetry, there is provided a centering mechanism, generally designated 48, which serves to restrain the housing 44 from movement in lateral directions, relative to the frame of the vehicle. The centering mechanism 48 includes an upstanding bracket 50 welded to the base 21 and a depending bracket 52 welded to the lower surface of the pillow plate 38. A rigid, elongated link forming a radius rod 54 is extended between the brackets and pivotally connected therewith through suitable means, including a pair of clevis pins, designated 56.

It should, therefore, be apparent that the radius rod 54 serves to interconnect the cradle 20 and the housing 44 in a manner such that frame members of the vehicle in which the air-ride suspension assembly 10 is installed remains centered relative to the cradle.

Moreover, it has, in practice, been found desirable to interconnect the housing 44 with the cradle 20 through a pair of shock absorbers 58 in order to damp out pivotal oscillation of said cradle about an axis coincident with the axis of the bearing pins 28 and to eliminate "bounce" in a manner well understood by those familiar with the design of suspension systems. In order to connect the shock absorbers, a pair of laterally spaced clevises 60 is affixed to the pillow plate 38, while a pair of similar clevises 62 is affixed to the cradle 20. Through these clevises the pair of shock absorbers 58 is interconnected with the housing 44 and the cradle 20.

As a practical matter, the air bags 34 are provided with a suitable pneumatic coupling 64 for facilitating a rapid coupling of the air-ride suspension assembly with a leveling valve 66, interconnected with the cradle through a link 67. This valve is adapted to be mounted on the air-ride suspension assembly 10 and connected with an air supply found aboard the vehicle in which the air-ride suspension assembly 10 is installed. The operation and function of the valve is well understood by those familiar with the assembly of air-ride suspension systems and is more fully illustrated and described in the aforementioned patent to Phillip J. Sweet et al.

In view of the foregoing, it should readily be apparent that the air-ride suspension assembly 10 is pre-fabricated into an integral configuration, at a point of manufacture, and thereafter shipped as a palletized unit to a point of installation.

One manner in which the air-ride suspension assembly 10 is installed is as follows: the frame members of the vehicle which is to receive the air-ride suspension assembly 10 are severed just forward of the shackles provided for coupling the frame with the leaf springs. Thus the frame is foreshortened with the interconnecting shackles being discarded as waste. The housing 44 is then positioned and united with the severed ends of the frame members, with the end portions of the leaf springs being extended through the cage 30 in a manner such that the bearing pins 28 come to rest on the upper surface of the leaf springs. Of course, where the pillow block 32 is employed, the bearing pins 28 are extended through the openings in the pillow blocks for effecting a coupling of the cradle 20 with the leaf springs.

The housing 44 is now welded to the truncated or foreshortened end portions of the frame members, in the manner illustrated in FIG. 1. Thereafter, a connection of the pneumatic coupling 64 is made with the leveling valve 66, in a manner well understood by those familiar with air-ride suspension assemblies.

It will be appreciated that the cradle 20 is, in effect, suspended from the trailing end portions of the leaf springs of the vehicle in which the air-ride suspension assembly 10 is installed, while the air bags 34 support the housing 44. Of course, the centering mechanism 48 serves to maintain symmetry between the housing 44 and the cradle during operation of the vehicle. Since the housing 44 receives the truncated end portions of the frame members of the vehicle, the vehicle frame is supported by the air bags 34 which are, in effect, interposed between the leaf spring of the vehicle and the frame.

With the air-ride suspension assembly 10 thus mounted, the vehicle is prepared for return to an operational status.

OPERATION

It is believed that in view of the foregoing description, the operation of the device will readily be understood and it will be briefly reviewed at this point.

With the air-ride suspension assembly 10 installed in a selected vehicle, in the manner hereinbefore described, the weight of the frame of the vehicle is transmitted to the leaf springs 14, at least in part, through the shackles 24. As the vehicle is caused to travel over relatively rough terrain, motion between the axle of the vehicle and the frame is accommodated through both the leaf springs and the air bags 34, functioning in a manner well understood by those familiar with air-ride suspension assemblies. The previously established symmetrical relationship is maintained between the housing 44 and the cradle 20 by the centering mechanism 48. Of course, due to the pivoting of the radius rod 54 at each of its opposite ends, angular movement of the housing 44, and hence the frame of the vehicle, about the longitudinal axis of the vehicle, is accommodated, while lateral displacement thereof, relative to the cradle 20 is precluded.

In view of the foregoing, it should be apparent that the air-ride suspension system which embodies the principles of the instant invention provides a practical solution to the perplexing problem of converting conventional suspension systems for vehicles characterized by live axles to suspension systems characterized by air bags, all without incurring substantial loss of operational time of the vehicle and without necessitating application of large amounts of skilled labor to the conversion effort.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by letters patent is:

1. An air-ride suspension assembly particularly adapted to be installed as an integrated unit on the frame of a wheeled vehicle comprising:
   A. a cradle adapted to be extended transversely beneath the frame of a selected vehicle and supported at each of the opposite ends thereof by said vehicle;
   B. a pair of laterally spaced air bags mounted on said cradle in substantially coplanar relation therewith;
   C. a pillow plate arranged in substantial coplanar relation with said cradle and seated on said pair of air bags adapted to receive adjacent end portions of a pair of longitudinal frame members for said vehicle; and
   D. centering means for supporting said frame in a centered relationship with said cradle comprising a pair of laterally spaced brackets, one bracket of said pair being rigidly affixed to said cradle and projected upwardly therefrom and the other bracket of said pair being rigidly affixed to said pillow plate and projected downwardly therefrom, and a radius rod extended between the brackets of said pair of brackets and pivotally connected thereto.

2. The suspension system of claim 1 further comprising means defining an open receiver for capturing the adjacent end portions of said frame members, including a cover plate integral with said pillow plate and arranged in vertically spaced relation therewith.

3. The assembly of claim 1 further comprising shackle means for suspending said cradle from end portions of a pair of laterally spaced leaf springs mounted on an axle for said vehicle.

4. The assembly of claim 1 further comprising a pair of energy-dissipating shock absorbers extended between said cradle and said pillow plate and connected thereto.

5. The assembly of claim 1 further comprising a housing for receiving the end portions of the longitudinal frame members in an encased relation, including a plurality of angularly related plates integrally connected with said pillow plate, and means for coupling said air bag in a pneumatic circuit.

6. The assembly of claim 1 being further characterized in that said housing is adapted to be welded to said frame members.

7. In combination with a wheeled vehicle including a frame, an axle and a pair of laterally spaced leaf springs mounted on the axle, an air-ride suspension assembly comprising:
   A. a cradle of a generally truncated U-shaped configuration extended transversely beneath a pair of laterally spaced longitudinal frame members for the frame of the vehicle and supported in suspension by the adjacent end portions of the pair of laterally spaced leaf springs shackled thereto;
   B. a pair of laterally spaced vertically oriented air bags seated on said cradle in substantial coplanar relation therewith;
   C. means including a pneumatic circuit characterized by a leveling valve and connected with said air bags for selectively varying the pneumatic pressure within the air bags of said pair;
   D. a transverse pillow plate symmetrically related to said cradle, seated on said pair of air bags and united in supporting relation with the adjacent end portions of said pair of laterally spaced frame members;
   E. centering means for maintaining symmetry between said pillow plate and said cradle including a first bracket depending from said pillow plate and a second bracket projected from said cradle and a radius rod extended between said first and second brackets and pivotally connected thereto at the opposite ends thereof; and
   F. a housing integrally connecting said frame members with said pillow plate including a plurality of angularly related plates integrally related with said pillow plate and welded to the end portions of the frame members.

8. A suspension assembly particularly adapted to be installed as an integrated unit on the frame of a wheeled vehicle comprising:

A. a cradle adapted to be extended transversely beneath the frame of a selected vehicle and supported at each of the opposite ends thereof by said vehicle;
B. resilient means mounted on said cradle in coplanar relation therewith;
C. a pillow plate arranged in substantial coplanar relation with said cradle and seated on said resilient means, adapted to receive adjacent portions of a pair of longitudinal frame members for said vehicle; and
D. centering means comprising a pair of laterally spaced brackets, one bracket of said pair being rigidly affixed to said cradle and projected upwardly therefrom and the other bracket of said pair being rigidly affixed to said pillow plate and projected downwardly therefrom, and a radius rod extended between the brackets and pivotally connected thereto.

9. In a suspension system for a wheeled vehicle characterized by at least one pair of laterally spaced longitudinal frame members, a load-bearing axle and a pair of laterally spaced leaf spring assemblies mounted on said axle in a transverse relation therewith, the improvement comprising:
A. a load supporting cradle of a generally U-shaped configuration characterized by an elongated base portion adapted to be extended transversely beneath a pair of laterally spaced frame members of a given vehicle and having a pair of mutually spaced, angularly related end portions;
B. means adapted to connect each end portion of the cradle in suspension from the aft end of one of a pair of laterally spaced leaf spring assemblies for the vehicle;
C. means for resiliently supporting said pair of frame members for rectilinear motion in a substantially vertical plane including at least one pair of mutually spaced air bags seated on the base portion between the end portions of the cradle, and means adapted to connect the air bags to the frame members in vertical supporting relation therewith including a pillow plate seated on said pair of air bags and extended in substantial parallelism with the base portion of the cradle and supported by the air bags in a substantially symmetrical relationship with the end portions of the cradle and adapted to receive the frame members in a vertically supported relationship; and
D. cradle centering means for restraining said cradle from transverse motion relative to said pair of frame members including a first bracket mounted on said pillow plate, a second bracket mounted on said cradle, and a rigid, elongated link extended between the first and second brackets and pivotally connected thereto.

* * * * *